UNITED STATES PATENT OFFICE.

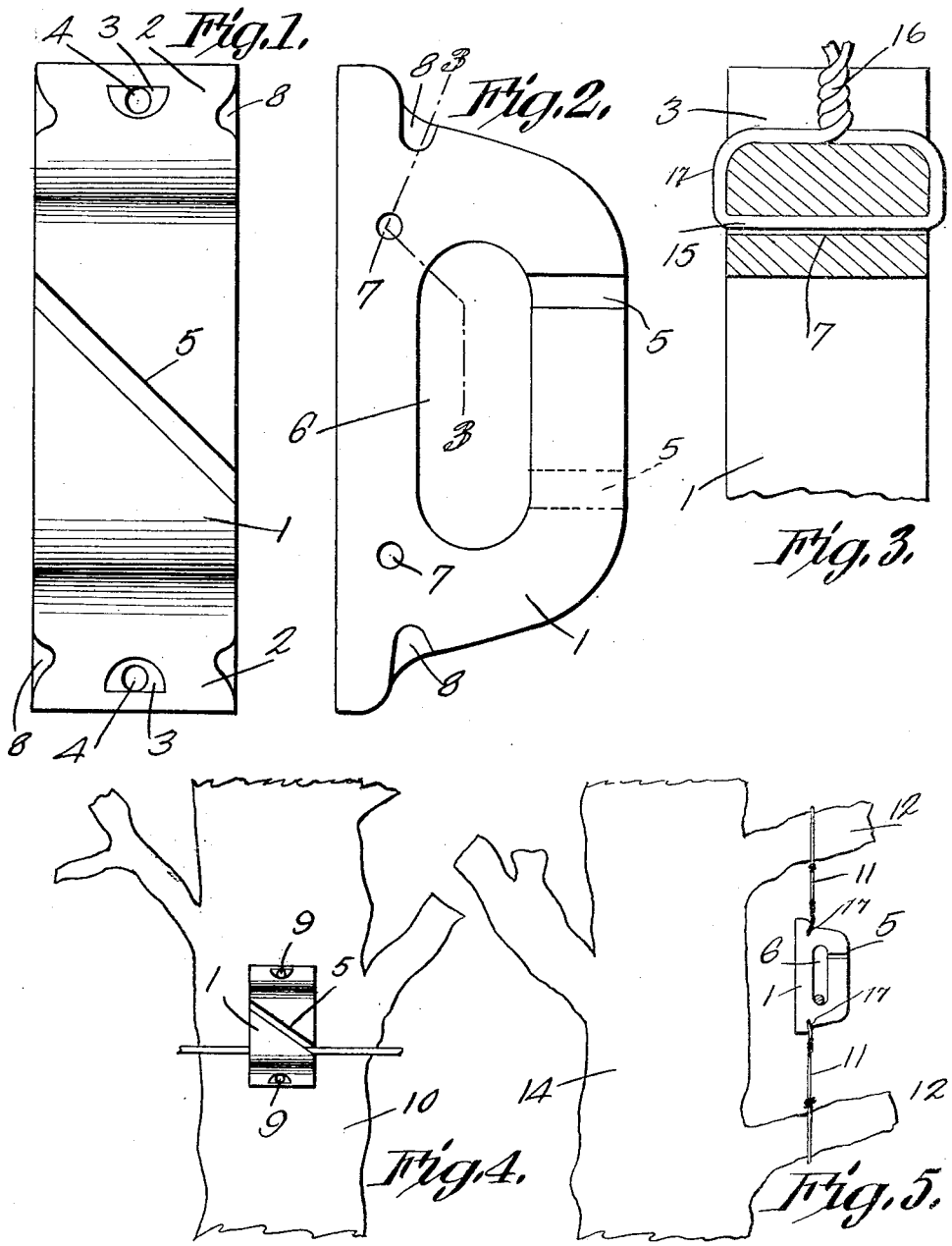

GEORGE ROSS, OF PARIS, ILLINOIS.

BRACKET.

1,230,521.

Specification of Letters Patent.

Patented June 19, 1917.

Application filed October 4, 1916. Serial No. 123,703.

*To all whom it may concern:*

Be it known that I, GEORGE ROSS, a citizen of the United States, residing at Paris, in the county of Edgar and State of Illinois, have invented a new and useful Bracket, of which the following is a specification.

The device forming the subject matter of this application is an insulator or bracket, adapted to receive telephone wires, telegraph wires and the like.

The invention aims to provide novel means whereby the wires may be mounted readily in the bracket and be removed therefrom, novel means being provided for connecting the bracket with a support.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in front elevation, a bracket or insulator constructed in accordance with the present invention;

Fig. 2 is a side elevation of the structure shown in Fig. 1;

Fig. 3 is a section taken approximately on the line 3—3 of Fig. 2; and

Figs. 4 and 5 are elevations illustrating various ways in which the bracket or insulator may be mounted.

In carrying out the present invention there is provided a bracket or insulator in the form of an eye 1, which may be made of porcelain or any other suitable material. The eye 1 has projecting ends 2 equipped with depressed seats 3, through which holes 4 are formed. The outer edge of the eye 1 is supplied with a diagonal slot 5 communicating with the central opening 6 of the eye. In the eye near to its ends, apertures 7 are formed. These apertures 7 extend entirely through the eye, and the axes of the apertures 7 are disposed parallel to the axis of the opening 6. At the ends of the eye and upon the sides thereof, notches 8 are fashioned.

By means of securing elements 9, inserted through the holes 4, the bracket may be attached to a tree or other support, indicated at 10.

If desired, wires 11 may be extended through the apertures 7 and may be bent upon themselves to form loops 17, the wires being twisted as shown at 16. When the wires are twisted at 16, the loops will be engaged in the notches 8, thus preventing a slipping of the loops 15. The wires 11 may be connected with the limbs 12 of a tree 14, or be otherwise disposed. The wires 11 will be found of use when it is desired to anchor the bracket or insulator on a brick wall.

Having thus described the invention, what is claimed is:—

A bracket of the class described, comprising an eye having a central opening, and provided upon its outer edge with a diagonal slot communicating with the opening, the eye being provided adjacent its ends with apertures therethrough, the axes of the apertures being disposed substantially parallel to the axis of the opening, the eye being equipped at its ends and at its sides with notches which coöperate with the apertures in receiving a supporting means for the bracket.

In testimony that I claim the foregoing as my own, I have hereto affixed my signature in the presence of two witnesses.

GEORGE ROSS.

Witnesses:
  W. R. McCALLISTER,
  T. J. BRENER.

Copies of this patent may be obtained for five cents each, by addressing the "Commissioner of Patents, Washington, D. C."